United States Patent [19]
Whitman et al.

[11] Patent Number: 5,723,937
[45] Date of Patent: Mar. 3, 1998

[54] LIGHT-SCATTERING COATING, ITS PREPARATION AND USE

[75] Inventors: Pamela K. Whitman; Thomas G. Parham, both of Gates Mills, Ohio

[73] Assignee: General Electric Company, Schenectady, N.Y.

[21] Appl. No.: 34,316

[22] Filed: Mar. 22, 1993

[51] Int. Cl.$^6$ ........................................ H01K 1/26
[52] U.S. Cl. .................. 313/116; 359/580; 445/58; 501/900
[58] Field of Search .................. 313/112, 116; 501/32, 33, 29, 900; 359/580, 581; 445/26, 27, 58; 106/816

[56] References Cited

U.S. PATENT DOCUMENTS

| | | | |
|---|---|---|---|
| 3,842,306 | 10/1974 | Henderson et al. | 427/166 |
| 3,868,266 | 2/1975 | Henderson et al. | 313/116 |
| 3,986,997 | 10/1976 | Clark | 260/29 |
| 4,042,727 | 8/1977 | Henderson et al. | 427/107 |
| 4,171,227 | 10/1979 | Derolf et al. | 106/692 |
| 4,275,118 | 6/1981 | Baney et al. | 428/412 |
| 4,450,255 | 5/1984 | Baney | 524/430 |
| 4,459,506 | 7/1984 | Beck | 313/315 |
| 4,500,669 | 2/1985 | Ashlock et al. | 524/440 |
| 4,571,365 | 2/1986 | Ashlock et al. | 428/412 |
| 4,710,677 | 12/1987 | Halberstadt et al. | 313/580 |
| 4,833,576 | 5/1989 | Mers et al. | 362/226 |
| 4,949,005 | 8/1990 | Parham et al. | 313/112 |
| 4,983,001 | 1/1991 | Hagiuda et al. | 359/359 |
| 5,035,745 | 7/1991 | Lin et al. | 106/287.16 |
| 5,036,244 | 7/1991 | Shaffer | 313/116 |
| 5,051,650 | 9/1991 | Taya et al. | 313/112 |
| 5,113,109 | 5/1992 | Kawakatsu et al. | 313/112 |
| 5,138,219 | 8/1992 | Krisl et al. | 313/112 |
| 5,143,445 | 9/1992 | Bateman et al. | 362/293 |

FOREIGN PATENT DOCUMENTS 61-002739  1/1986  Japan ........................ C08J 7/04

*Primary Examiner*—Mark R. Powell
*Attorney, Agent, or Firm*—Stanley C. Corwin

[57] ABSTRACT

A light-scattering coating comprising light-scattering particles, such as alumina, dispersed in a silica matrix is formed by applying to the filter a silicone solution in which is dispersed colloidal silica and the light-scattering particles to a suitable substrate and then pyrolyzing the dispersion at high temperature to drive off the organic components and form the silica matrix. This coating is hard and abrasion resistant and is useful for reflectors, lamps and lenses.

23 Claims, 4 Drawing Sheets

LIGHT-SCATTERING COATING, ITS PREPARATION AND USE

BACKGROUND OF THE INVENTION

1. Field of the Invention

This invention relates to a light-scattering coating, its preparation and use. More particularly, this invention relates to a light-scattering coating comprising light-scattering particles dispersed in a silica-containing, glassy binder, its preparation from a silicone coating material and its use on various articles, such as lamps.

2. Background of the Disclosure

Electric lamps employing a filament or arc as the source of light emit light in a pattern in which the light source is visible, unless the emitted light is broken up. Means commonly employed to break up a light source image include a lenticuled lens (with or without the use of a reflector), sandblasting the lamp envelope, etching the lamp envelope or coating the lamp envelope to scatter the emitted light and diffuse the light source image of the arc or filament. Acid etching or coating the lamp envelope is most commonly found in a conventional household type of incandescent lamp wherein the glass envelope enclosing the filament is acid etched (frosted) and/or coated inside with a particulate, light-diffusing powder. A mixture of clay and silica has been used as a particulate, light-scattering powder, because of its availability, light-scattering properties, chemical inertness, low cost and ability to withstand the high temperatures reached during lamp operation.

High intensity incandescent lamps used for stage and studio lighting employ a fused quartz filament or arc chamber and are sometimes sand-blasted to break up the emitted light source image so that the light emitted by the lamp is more diffuse and the light source is not visible on the object(s) being illuminated. The fused quartz is able to withstand the extremely high temperatures often exceeding 900° C. reached during lamp operation. However, sandblasting can weaken the strength of the quartz and is a nuisance to use in most manufacturing operations as it tends to contaminate large areas of a plant with sand particles and is noisy and dusty.

SUMMARY OF THE INVENTION

The present invention relates to a light-scattering coating comprising light-scattering particles in a vitreous, silica binder. By light-scattering coating is meant a coating which is able to scatter visible light radiation broadly ranging between 380 to 770 nm and preferably 400 to 750 nm. When used with a lamp comprising a light-transmissive lamp envelope enclosing a source of electric light within wherein the coating is disposed on the surface of the lamp envelope, the coating scatters the visible light emitted by the source, thereby diffusing the light source image in the light emitted by the lamp. The light source may be either an arc discharge or a filament. The coating is formed by dispersing particles of suitable light-scattering material in a liquid binder comprising a dispersion of colloidal silica in a silicone. The liquid dispersion is then sprayed, dipped or flowed onto the article, with the coated article then dried and heated to elevated temperature to drive out the organic material and form a coating comprising light-scattering particles in a vitreous or glassy binder comprising silica.

High intensity stage and studio incandescent lamps have been made according to the invention comprising a vitreous, light-transmissive fused quartz envelope hermetically sealed and enclosing a tungsten filament and halogen within, with a light-scattering coating of the invention disposed on the outer surface of the lamp envelope. The light-scattering coating of the invention is also useful for coating a vitreous lens and vitreous, light-transmissive reflectors having a multilayer optical interference coating as the light reflecting surface. Employing a light-scattering coating on the outer non-reflecting surface diffuses the light source image inside providing a soft, decorative light effect. The light-scattering coating of the invention will be useful wherever an abrasion resistant, hard, light-scattering coated is needed, provided the substrate is able to withstand the high temperature required to form the coating.

DETAILED DESCRIPTION

Figure 1A:
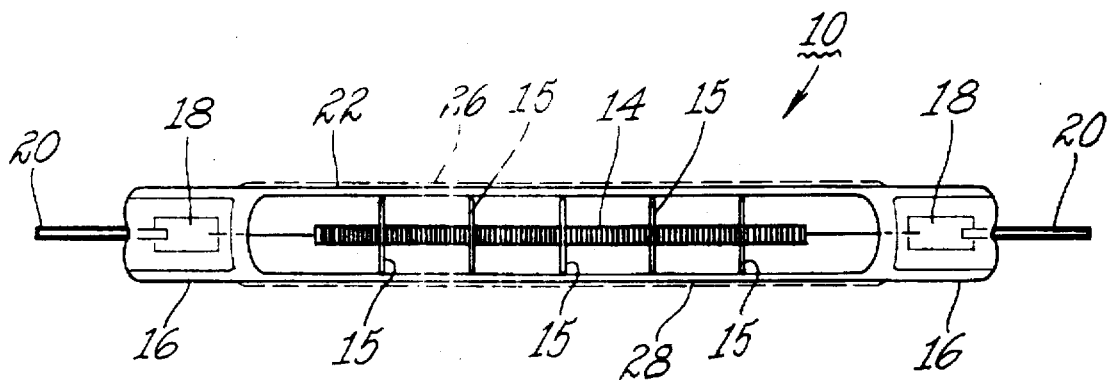
FIGS. 1(a) and 1(b) schematically illustrate an incandescent lamp having an optical interference filter and light-scattering coating on the outer surface of the lamp envelope and a detail of the coating and filter on the lamp surface.
Figure 1B:
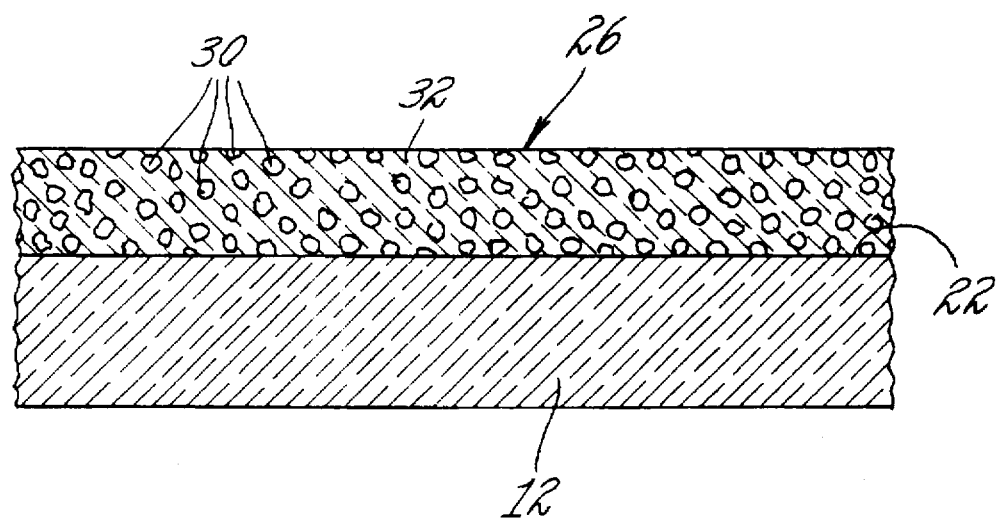
Figure 2A:
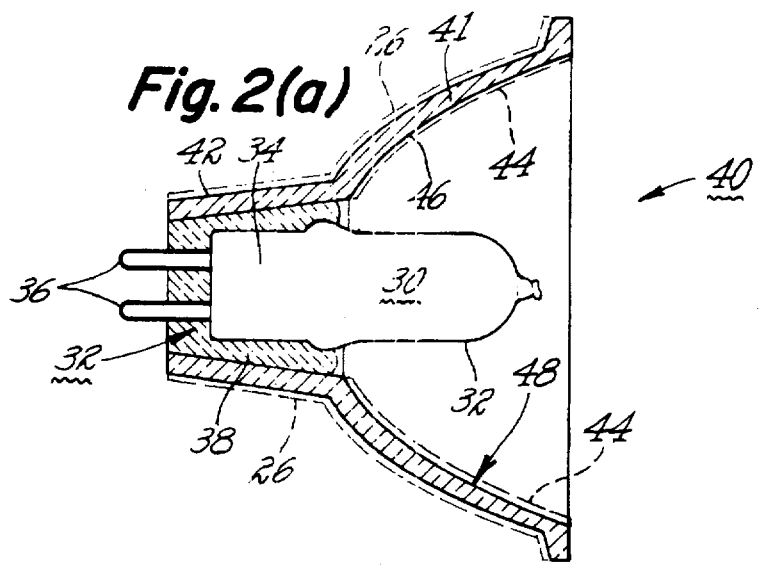
FIGS. 2(a), 2(b) and 2(c) schematically illustrate an incandescent lamp mounted in a glass reflector having a multilayer optical interference filter as the light-reflecting means with a coating of the invention on (a) the outer reflector surface, (b) the inner reflector surface and (c) the lamp.
Figure 2B:
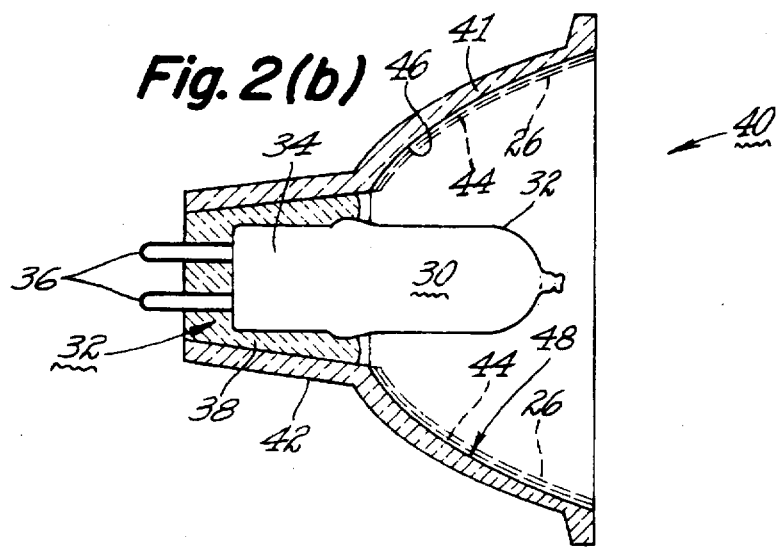

Referring to FIG. 1(a), linear, incandescent lamp 10 is shown comprising visible light-transparent fused quartz lamp envelope 12 having a filament 14 hermetically sealed within and supported in the envelope by means of five filament supports 15. The lamp is hermetically sealed at both ends by a customary pinch seal 16 over molybdenum sealing foils 18 with inleads 20 extending out through the pinch seal portions to provide electricity to filament 14 through molybdenum foil seal 18. Outer envelope surface 22 is coated with a light-scattering coating 26 according to the invention. The coating comprises a glassy, silica binder material 32 containing light-scattering particles 30. A portion of the fused quartz substrate 12 coated with the light-scattering coating 26 of the invention is shown in FIG. 1(b) at the detail at 28. The detail illustrated in FIG. 1(b) is meant to be used only for purposes of illustrating this feature of the invention and not an exact detail of the coating. The detail in FIG. 1(b) is also not intended to be drawn to scale. The invention is not limited to this particular embodiment of a lamp comprising a fused quartz envelope having a filament as the light source hermetically sealed within with the outer surface of the lamp envelope coated with a light-scattering coating according to the invention. Other lamps, lamp types and lamp configurations can also be used in accordance with the invention. Further, a combination of multilayer optical interference filter and light-scattering coating may be employed on one or more surfaces of a light-transparent or light-transmissive reflector such as the all-glass reflector coated with an optical interference film disclosed in U.S. Pat. No. 5,143,445 and as illustrated in FIGS. 2(a) and 2(b). In yet another embodiment, the lamp may be surrounded by a light-transparent or light-transmissive shroud (such as a glass or fused quartz shroud) surrounding the lamp and spaced apart from same with the filter and light-diffusing coating disposed on a surface of the shroud.

Figure 2C:
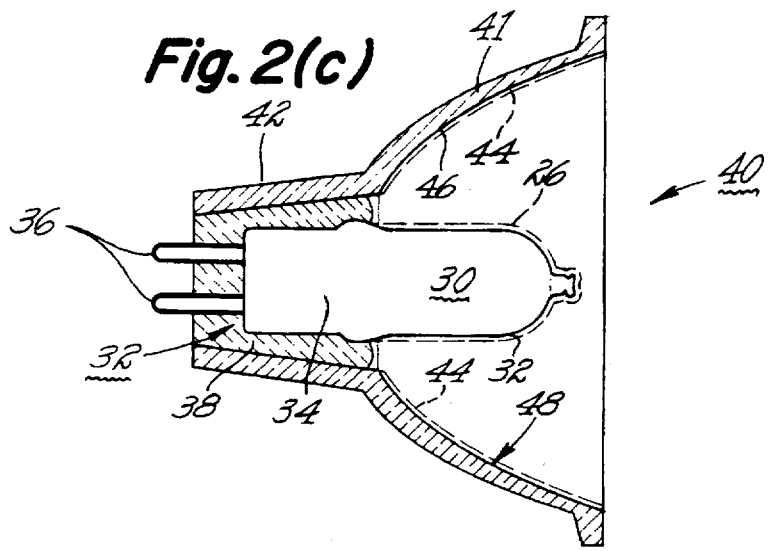

Turning now to FIG. 2(a) there is schematically illustrated a lamp and reflector combination 40 comprising lamp 30 having a vitreous envelope 32 hermetically sealed at 34 by means of a customary pinch seal or shrink seal and having exterior leads 36. Lamp 30 is cemented into cavity 14 of glass reflector 41 by cement 38. Lamp and reflector combinations of this type having an optical interference filter 14 on the interior reflecting surface 46 of the parabolic reflecting portion 48 of glass reflector 41 are known to those skilled in the art as are suitable cements for securing the lamp in the reflector. U.S. Pat. No. 4,833,576, the disclosures of which are incorporated herein by reference, discloses such lamp and reflector combinations and cement for cementing the lamp in the reflector. Lamp 30 also contains a filament and inleads or an arc (not shown) within envelope 32. A light-scattering coating 26 according to the invention comprising particles of light-scattering material dispersed in a silica binder is shown disposed on the outer surface 42 of glass reflector 41. Optical interference filter 44 is employed as either a cold mirror or a hot mirror for reflecting the light emitted by lamp 30 as is known to those skilled in the art. During operation of the lamp and reflector combination 40, some of the light emitted by the lamp 30 is discernible from the outside surface 42 of reflector 41, the color being determined by the particular characteristics of multilayer optical interference filter 44. Without the presence of the light-scattering coating 26 present on the exterior surface of the reflector, the light discernible from the outside surface of the reflector is substantially uneven with a bright spot emanating from the vicinity of the location of the filter or arc light source within the lamp. With a light-scattering coating 26 of the invention disposed on the exterior surface of the reflector, the emitted light is more even, diffuse and more pleasing to the eye in not having the hot spot or glare associated with the light source as it would have without the presence of the light-scattering coating. FIG. 2(b) is similar to 2(a) except that the light-scattering coating 26 of the invention is on the light-reflecting, multilayer optical interference filter on the interior reflecting surface for producing a soft light image reflected and projected forward of the reflector. In FIG. 2(c) the light-reflecting coating 26 is on the exterior surface of the lamp 30 for projecting forward a softer light beam. In the embodiment of FIG. 2(b) and 2(c), the reflective coating 44 could be a metal, such as aluminum, and is not intended to be limited to an optical interference filter.

Figure 3:
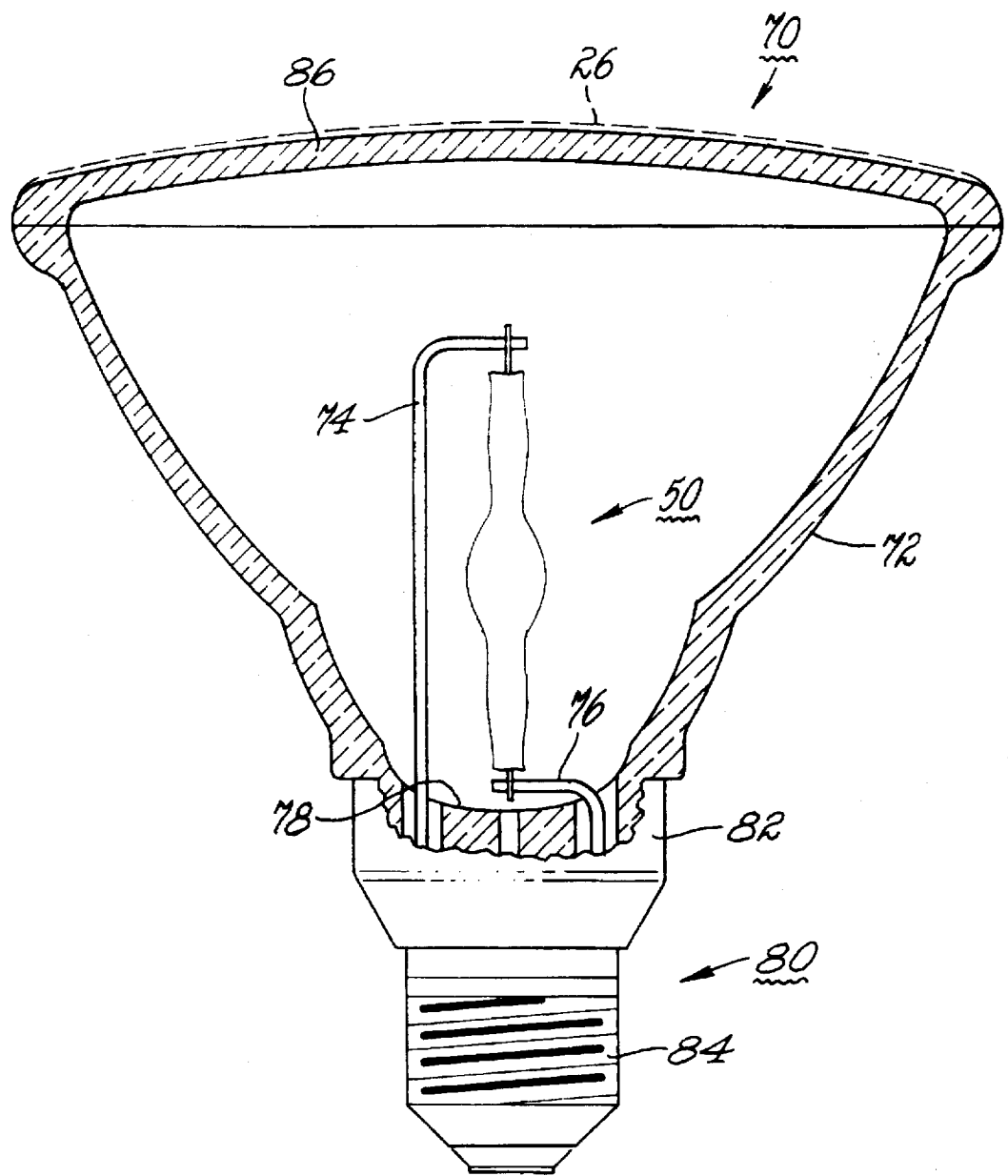
FIG. 3 schematically illustrates a PAR lamp with a coating of the invention on the exterior surface of the glass lens.

Turning next to FIG. 3, a lamp and reflector combination 70 is schematically illustrated comprising glass reflector 72 having a lens 86 at one end and a metal base assembly 80 at the other end. The metal base comprises a metal collar portion 82 attached to the bottom portion 78 of the reflector by suitable means and terminating in standard metal screw base 84. Lamp 50 is illustrated as a double-ended incandescent lamp wherein the filament and molybdenum foil seals are not shown. Lamp 50 is held in place by means of leads 74 and 76 welded to the outer leads of the lamp. Leads 74 and 76 are cemented in the bottom portion 78 of reflector 72 and are connected by lead wires (not shown) to the metal base portion. A light-scattering coating 26 according to the invention is shown disposed on the outer surface of glass lens 86. The light-scattering coating 26 of the invention enables the light emitted by the lamp and projected forward by the reflector to be diffuse.

As set forth above, the light-scattering coating employed in the practice of the invention comprises a vitreous or glassy silica binder containing light-scattering particles. Light-scattering particles useful in the coating of the invention include any material transparent to visible light having an index of refraction different from that of the silica binder and which is electrically non-conductive, chemically inert with respect to the substrate and the binder material and not adversely affected by the operating temperature of the lamp, the radiation emitted by the lamp or the ambient in which the lamp is operating. Illustrative, but non-limiting examples of light-scattering particulate materials useful with the coating of the invention and which meet these requirements include $Al_2O_3$, $BN$, $Y_2O_3$, $ZrO_2$, $SiC$, $Ta_2O_5$, $Si_3N_4$, $TiO_2$ and $Nb_2O_5$. In order to efficiently scatter light across the entire visible spectrum, the light-scattering particles should have an effective, or agglomerated, physical cross-section ("effective diameter") of at least one-quarter the wavelength of red light (i.e., 180 nm). Some particles smaller than this may be included in the distribution, but they participate very little as optical scatterers. The lower limit in preferred particle size is thus set by the ability of individual particles to effectively scatter (about 0.2 microns). The upper limit lies between 0.5–3 microns and is influenced by the amount of oversize particles and their effective diameter as is explained below. Alumina particles primarily ranging in size from 0.2 to 0.4 micron have worked satisfactorily in the practice of the invention.

As set forth above, the binder for the light-scattering coating useful in the practice of the invention is a glassy silica which is derived from a coating precursor comprising a liquid dispersion of colloidal silica in a silicone. Silicone is used herein in its generic sense. Coatings have been made wherein the silicone is a water-alcohol solution of the partial condensate of $R(SI(OH)3)$ wherein R is an alkane, such as methyl trimethoxy silane. Examples of suitable silicones of this type, including some which are disclosed as containing colloidal silica are disclosed, for example, in U.S. Pat. Nos. 3,986,997; 4,275,118; 4,500,669 and 4,571,365, the disclosures of which are incorporated hereby by reference. Coatings made from these materials are able to withstand the high temperatures, often in excess of 900° C., reached by the surface of the lamp envelope of a high intensity filament or arc discharge lamp after the coating precursor has been converted to a glassy silaceous material by burning out the organic material. After the liquid coating precursor of the invention comprising light-scattering particles dispersed in a silicone solution in which is dispersed colloidal silica has been applied to an article such as a light-reflecting coating, a lamp envelope or glass reflector and dried at a low temperature to evaporate the solvents, the precursor coated article is slowly heated in air to an elevated temperature to pyrolyze the organic matter and form a glassy coating of the invention comprising light-scattering particles dispersed in a silica matrix or binder. A temperature of 350° C. has been found sufficient to pyrolyze the organics out of the coating and form the glassy silica binder. Densification and sintering of the so-formed silica improves its strength and is achieved by heating the coated article to a higher temperature or, if the article is a lamp, by energizing the lamp. The temperature of a linear fused quartz lamp envelope reaches 900° C. and the coating is fully densified within the first hour of lamp operation. Silica is used here in a generic sense in that some silicates may also be present. Thus, the light scattering coating of the invention comprises a glassy, silica binder containing lighting scattering particles. The invention will be further understood with reference to the examples below.

Multilayer optical interference filters also known as thin film optical interference filters which comprise alternating layers of two or more materials of different refractive index and their use with lamps, reflectors and lenses are known to those skilled in the art. These filters are used to selectively reflect and/or transmit light radiation from various portions of the electromagnetic spectrum such as ultraviolet, visible and infrared radiation. These filters are used in the lamp industry, as stated, on reflectors, lenses and lamp envelopes. These filters have been found to be particularly useful in improving the illumination efficacy or efficiency primarily of incandescent lamps by reflecting infrared radiation emitted by the filament (or arc) back to the filament (or arc) while transmitting the visible portion of the electromagnetic spectrum emitted by the light source, thereby reducing the amount of electrical energy required to be supplied to the filament to maintain its operating temperature. In the embodiment disclosed above, lamps were made wherein the multilayer optical interference filter reflected the infrared radiation emitted by the filament back to the filament and, at the same time, transmitted all of the light in the visible portion of the electromagnetic spectrum (e.g., 400–750 nm). Multilayer optical interference filters used in the lamp industry for applications where the filter will be exposed to high temperatures in excess of 500° C. or so are made of alternating layers of refractory metal oxides such as tantala (tantalum pentoxide), titania (titanium dioxide), niobia (niobium pentoxide) and silica ($SiO_2$) wherein the silica is the low refractive index material and the tantala, titania or niobia is the high refractive index material. Such filters and lamps and reflectors employing same are disclosed, for example, in U.S. Pat. 5,143,445; 5,138,219; 4,588,923; and 4,663,557 as illustrative, but non-limiting examples. These multilayer filters are applied using evaporation or sputtering techniques, dip-coating into organic precursors and also by chemical vapor deposition (CVD) and low pressure chemical vapor deposition (LPCVD) processes. In actual lamps made according to the invention of the type disclosed in FIG. 1, multilayer optical interference filters for reflecting the infrared radiation emitted by the filament back to the filament and at the same time transmitting visible light radiation were made of alternating layers of tantala and silica applied to the outer surface of the fused quartz lamp envelope by LPCVD as disclosed in U.S. Pat. No. 4,949,005 (the disclosures of which are incorporated herein by reference) having a total of 26–30 layers and some with over 40 layers as disclosed, for example, in U.S. Pat. Nos. 5,143,445 and 5,138,219. However, it should be understood that the invention is not limited to the use of such a filter which only transmits visible light radiation and reflects infrared radiation. Such filters can also be designed for changing the color emitted by the lamp. EXAMPLES Linear incandescent lamps according to the invention were made as illustrated in FIG. 1 having a tubular quartz envelope 10 millimeters in diameter, 105 millimeters long and operated at 120 volt and 650 watts. In order to achieve a light-scattering coating of the invention on the outer surface of the tubular quartz lamp envelope, these lamps were coated with a precursor coating according to the invention containing 2 parts by weight of a Degussa C fumed alumina powder in 15 parts by weight of a thermosetting silicone solution. The silicone solution was made by adding 70 cc butanol and 70 cc isopropanol to 60 cc of a Silvue 313 Abrasion Resistant Coating obtained from SDC Coatings, Inc., of Garden Grove, Calif. The Silvue 313 is a dispersion of colloidal silica in a solution of a partial condensate of $R(Si(OH)_3)$ wherein R is a methyl group. This dispersion contains 5% acetic acid, 13% n-butanol, 30% isopropanol 1% methanol (all wt. %), and water. The total solids content of the colloidal silica and methyl trimethoxy silane in the Silvue 313 ranges between 20–25% wt. %. The Degussa C alumina was stirred into the silicone solution, followed by placing the alumina containing solution in an ultrasonic bath. The Degussa C has a primary particle size of 10 nm and a useful or agglomerated particle size having an effective diameter ranging between roughly 200–500 nm or 0.2–0.5 micron. Lamps were dipped in this precursor coating mixture and air dried for at least five minutes. The dried, coated lamps were then placed in a laboratory oven at 350° C. for thirty minutes to drive off or pyrolyze the organic material and begin densification of the silica. After this treatment the lamps may be energized or lit at full rated voltage without darkening or blackening of the coating. Since the lamp envelope can reach temperatures in excess of 900° C., the coating continues to densify during the first hour of use. The coating of the invention, which is a glassy silica binder containing light scattering particles (in this case alumina), is formed after the 350° C. heat treatment and the silica binder merely continues to densify up to the theoretical limit of silica at higher temperatures.

Lamps receiving this treatment were energized and burned for over 2000 hours with no noticeable degradation of the coating or diminution of the diffused light-emitting properties of the lamp. The light scattering or diffusing coating generally had excellent adhesion to the quartz outer surface of the lamps and also to lamps having filters of alternating layers of tantala and silica. Lamps having filters had multilayer optical interference filters for reflecting infrared radiation and transmitting visible light radiation having a 24 layer design (tantala/silica) of the type disclosed in U.S. Pat. No. 5,143,445 and also a 46 layer design of the type disclosed in U.S. Pat. No. 5,138,219 employing the LPCVD process disclosed in these patents. However, the adhesion of the light-scattering or diffusion coating can vary depending on the surface condition of the filter (i.e., surface cracking and roughness of the filter). Accordingly, a precoat or primer that was found to provide adequate adhesion of the light-diffusing coating to the filter without adversely affecting the optical properties was a mixture of the Alon C (OR E) alumina powder and boric acid in about a 3 to 1 weight ratio to which was added methanol and Cellosolve acetate. The precoat was also applied by dipping. The precoat or primer required less than thirty minutes to dry. The lamps were then coated with the light- scattering coating of the invention which was a mixture of the silicone solution and Degussa C referred to above. These lamps also had excellent optical properties in that the lamps emitted diffuse light and the coating adhesion was excellent. All the lamps made with the light-scattering coating containing Degussa C alumina had specular transmissions less than 15% and total transmission (specular plus diffuse or scattered light) greater than 50%.

Figure 4:
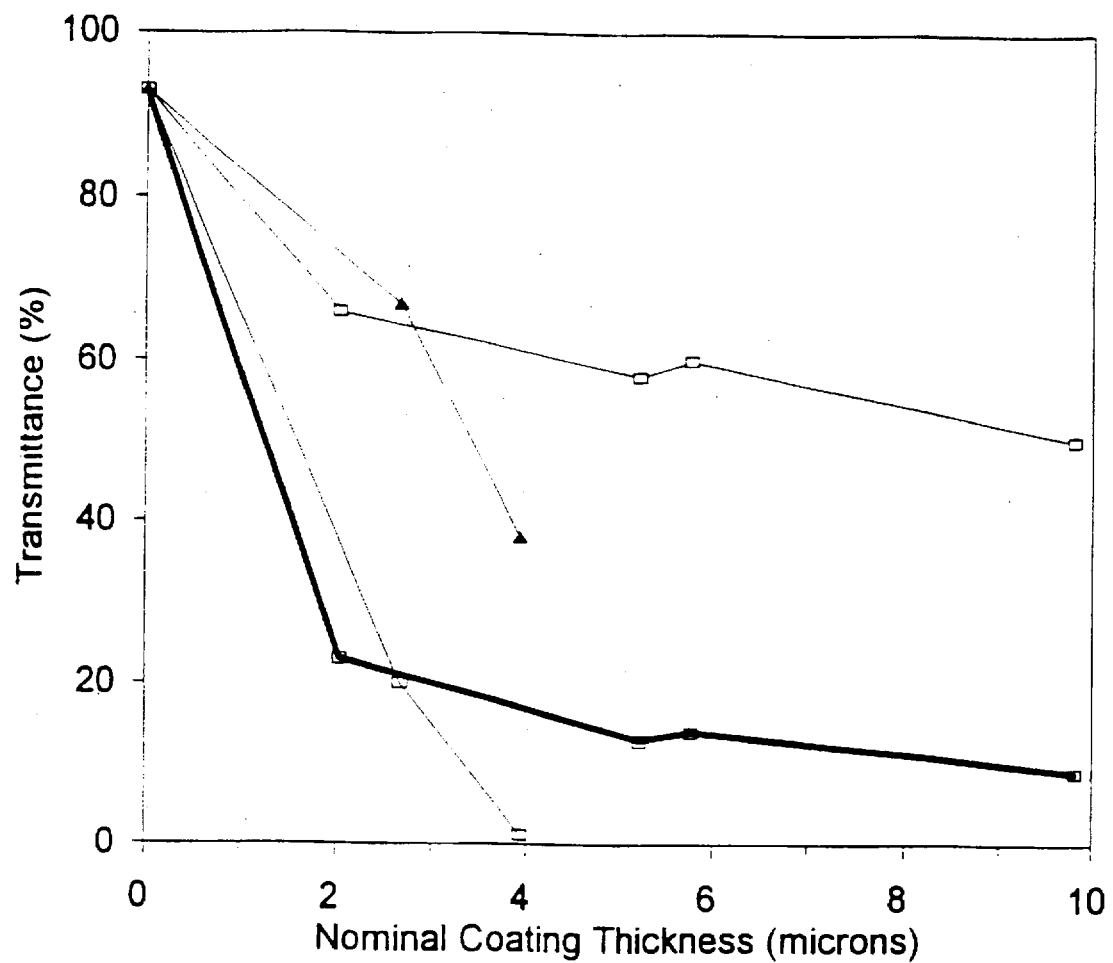
FIG. 4 is a graph of percent transmittance of a lamp as a function of the amount of light-scattering coating disposed on the optical interference filter.

Visual observations and experimental measurements have shown that the appearance and optical performance of sandblasted quartz can be simulated if the diffuse coating has a specular transmittance less than 15%. Diffuse reflection of visible light back into the lamp is undesirable since some of this light is lost due to internal absorption on leads or the filament. This means total transmittance (specular plus diffuse forward light) should be as high as possible —at least 50%. FIG. 4 shows the effect of coating thickness of the coating of the invention on transmittance for two different particle size distributions. In these examples the weight concentration of particles in the final coating was held constant. The Degussa alumina powder consists of particles primarily ranging from 0.2 to 0.4 micron in effective particle size or diameter. Specular transmittances below 15% were readily achieved over a wide range of coating thickness while maintaining high total transmittance greater than 50%. Coatings between 4 and 10 microns thick had acceptable performance and acceptable visual appearance. The Baikowski CR30 alumina powder consisted of larger particles than the Degussa. About 35% OF the particles were smaller than 1 micron, 80% of the particles were smaller than 3microns, and 20% of the particles were between 3 and 8 microns. The larger particles resulted in excessive scattering. The desired properties of <15% specular transmittance and >50% total transmittance could be achieved only at a coating thickness of less than 4 microns. At this film thickness, the CR30 coating had incomplete coverage of particles on the filter surface. Although the transmittance targets could be met over a narrow range of film thicknesses, the resulting coating was sufficiently spotty or grainy to be aesthetically unacceptable in appearance.

It is understood that various other embodiments and modifications of the practice of the invention will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A light-transmissive article having at least one surface with at least a portion of said surface having disposed on it a light-scattering coating comprising light-scattering particles having an effective size of at least about 0.2 microns in a vitreous, silica binder.

2. An article of claim 1 wherein the refractive index of said light-scattering particles is different from the refractive index of said binder.

3. An article of claim 2 wherein said light-scattering particles are transparent to visible light radiation.

4. An article of claim 3 wherein the effective particle size of said light-scattering particles does not exceed 3 microns.

5. An article of claim 3 wherein said refractive index of said light-scattering particles is greater than the refractive index of said silica binder.

6. An article of claim 5 being a vitreous lens.

7. An article of claim 5 being a vitreous reflector.

8. A lamp comprising a light-transmissive envelope enclosing a source of visible light with a light-scattering coating comprising light-scattering particles having an effective particle size of at least about 0.2 microns in a vitreous, silica binder disposed on the surface of said envelope and wherein said light-scattering particles have a refractive index different from the refractive index of said silica binder.

9. A lamp according to claim 8 wherein said light-scattering particles are transparent to visible light.

10. A lamp according to claim 9 wherein said light-scattering particles have an effective particle diameter no greater than 3 microns.

11. A lamp according to claim 10 wherein said light-scattering particles comprise alumina.

12. A process for forming a light-scattering coating comprising light-scattering particles having an effective particle size of at least about 0.2 microns in a vitreous, silica binder on a substrate, said process comprising applying to said substrate a dispersion of particles of light-scattering material in a dispersion of colloidal silica in a liquid silicone solution, drying the applied dispersion to remove solvents therefrom and then heating said dried dispersion at elevated temperature to drive out the organic component of said liquid silicone solution and convert a silicone component and said colloidal silica to a vitreous, silica binder containing said light-scattering particles.

13. A process according to claim 12 wherein said silicone solution comprises a partial condensate of $R(Si(OH)_3$ wherein R is an alkane.

14. A process according to claim 13 wherein R comprises a methyl group.

15. A process according to claim 13 wherein said elevated temperature is at least 350° C.

16. In combination, a light-transmissive reflector having an exterior surface and an interior, light-reflecting surface and an electric lamp light source mounted within, wherein at least a portion of said exterior surface is coated with a light-scattering coating comprising light-scattering particles having an effective particle size of at least about 0.2 microns in a vitreous, silica binder.

17. A combination of claim 16 wherein said light-reflecting surface comprises a multilayer, optical interference filter.

18. In combination, a reflector having an interior, light-reflecting surface and an electric lamp light source mounted within, wherein at least a portion of said interior, light-reflecting surface is coated with a light-scattering coating comprising light-scattering particles having an effective particle size of at least about 0.2 microns in a vitreous, silica binder.

19. The combination of claim 18 wherein said light-reflecting surface comprises a multilayer, optical interference filter.

20. In combination, a light-reflector having an interior light-reflecting surface and an electric lamp light source mounted within, wherein at least a portion of said light source is coated with a light-scattering coating comprising light-scattering particles having an effective particle size of at least about 0.2 microns in a vitreous, silica binder.

21. The combination of claim 20 wherein said lamp is coated with a multilayer optical interference filter and said light-scattering coating is disposed on said filter on said lamp.

22. The article of claim 1 wherein said light-scattering particles are selected from the group consisting of $Al_2O_3$, BN, $Y_2O_3$, $ZrO_2$, SiC, $TaO_5$, $Si_3N_4$, $TiO_2$, $Nb_2O_5$ and mixtures thereof.

23. The article of claim 22 wherein said light-scattering particle is $Al_2O_3$.

* * * * *